June 15, 1965 B. I. ULINSKI 3,189,366
STEERING MECHANISM FOR INDUSTRIAL TRUCK
Filed Dec. 6, 1962 3 Sheets-Sheet 1
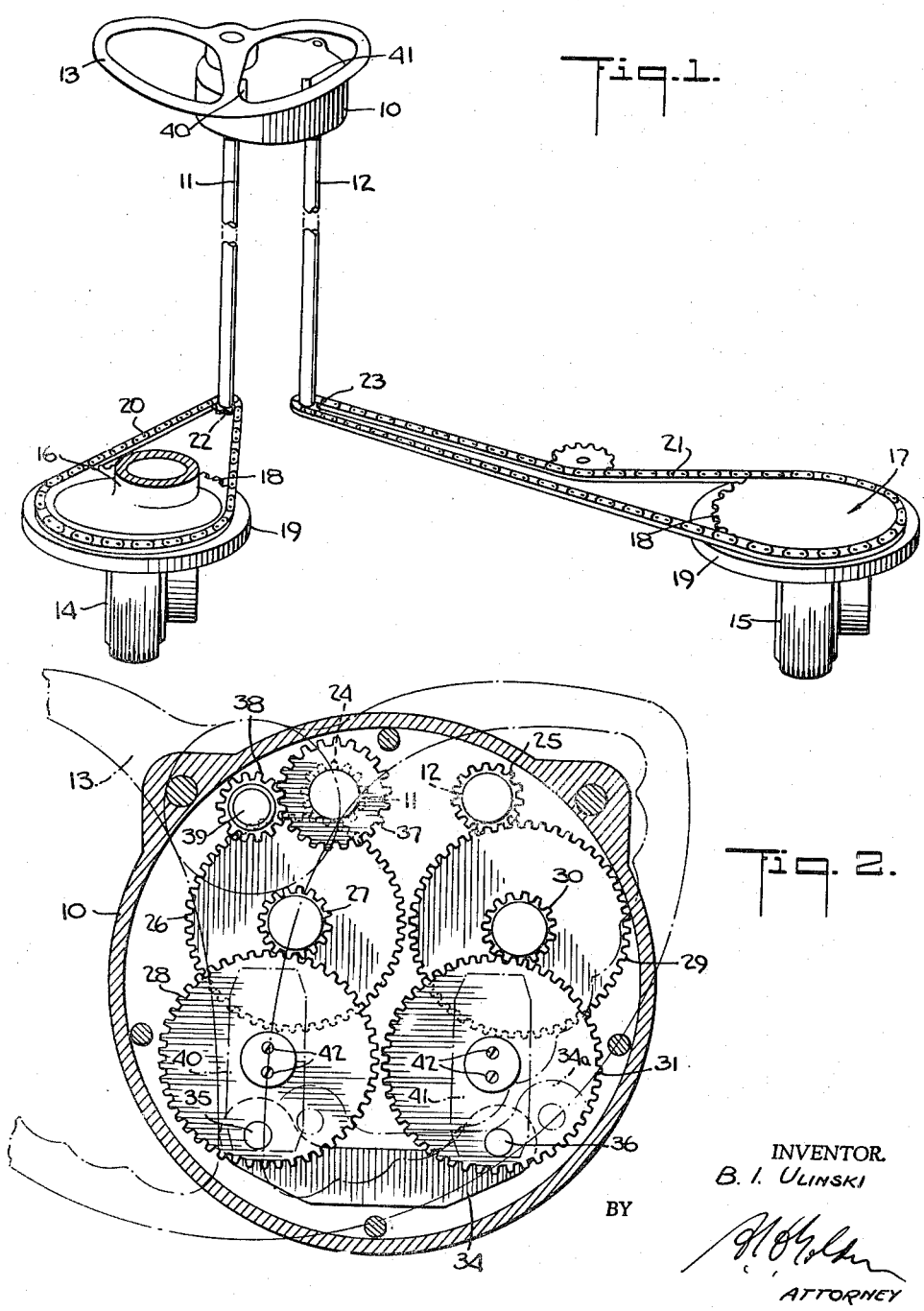
INVENTOR.
B. I. ULINSKI
BY
ATTORNEY

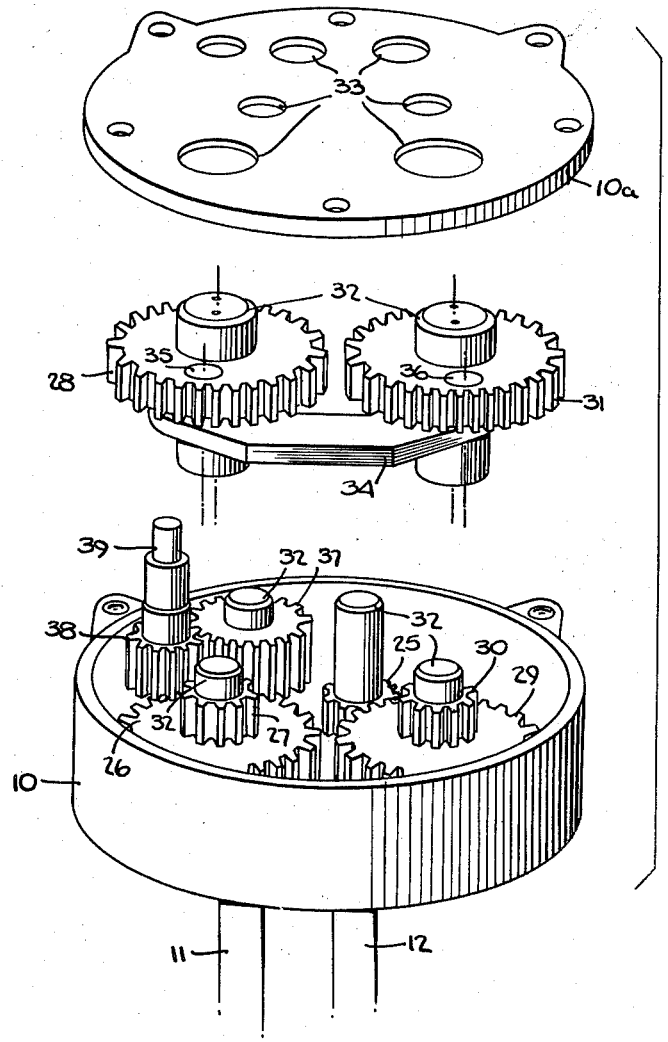

June 15, 1965  B. I. ULINSKI  3,189,366
STEERING MECHANISM FOR INDUSTRIAL TRUCK
Filed Dec. 6, 1962  3 Sheets-Sheet 3
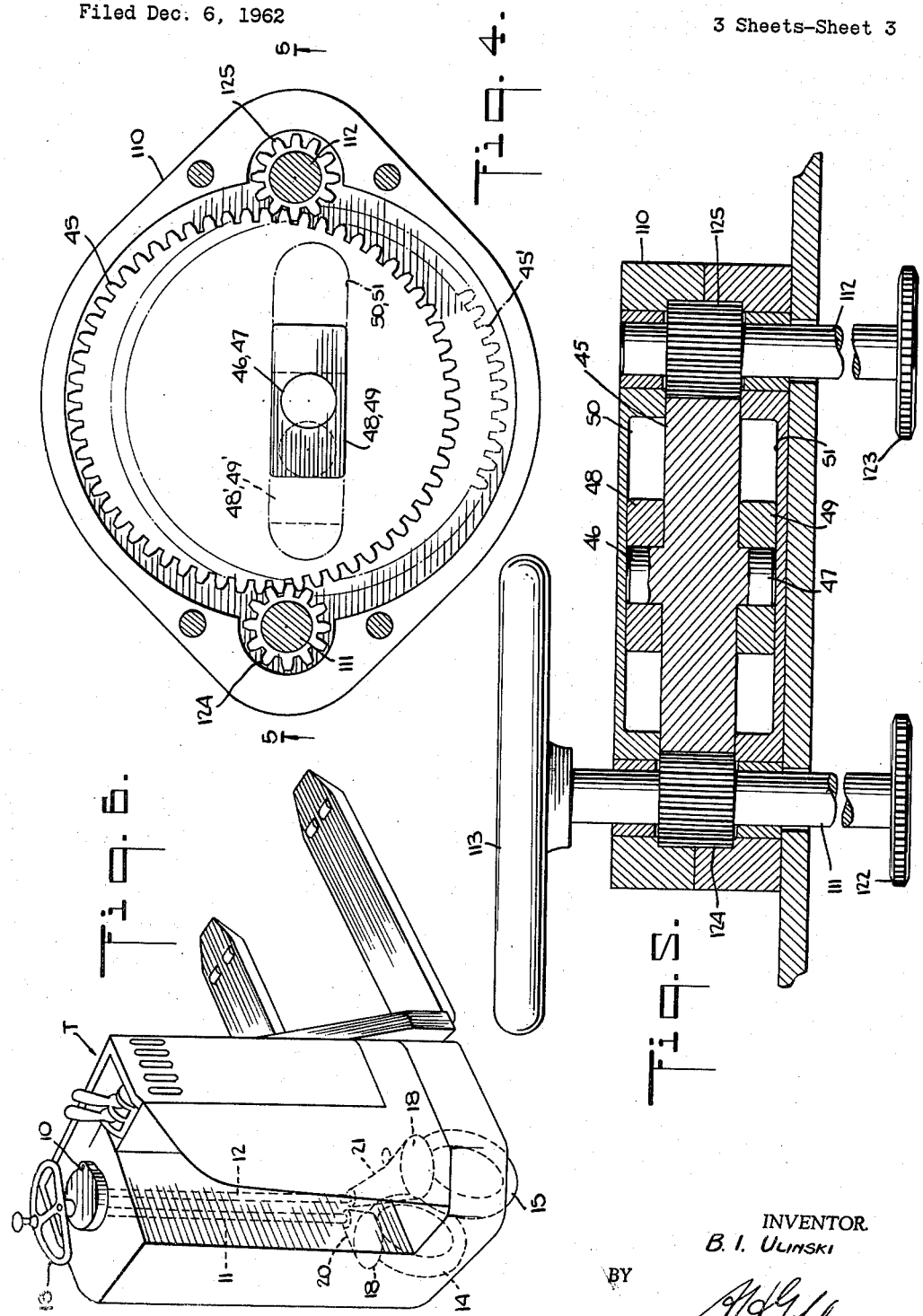
INVENTOR.
B. I. ULINSKI
BY
ATTORNEY

United States Patent Office 3,189,366
Patented June 15, 1965

3,189,366
STEERING MECHANISM FOR INDUSTRIAL TRUCK
Bronislaus I. Ulinski, Flossmoor, Ill., assignor, by mesne assignments, to Yale & Towne, Inc., New York, N.Y., a company of Ohio
Filed Dec. 6, 1962, Ser. No. 242,743
19 Claims. (Cl. 280—93)

This application is a continuation-in-part of my application Serial No. 128,404, filed August 1, 1961, now abandoned.

My invention relates to a steering apparatus for industrial trucks, and more particularly to a novel apparatus that will steer two wheels in differential angular relation to one another so as to effect geometric steering of the truck.

Obviously, many mechanisms have been developed for contributing geometric steering. However, in an industrial truck, it is necessary not only to effect geometric steering but also to effect sharp angular steering such as is not possible with conventional steering apparatus. The art has been faced by this problem for many years and numerous solutions have been suggested. However, so far as I know, no wholly satisfactory solution has been found, mainly for the reason that there is very little space available in an industrial truck for containing the type of apparatus that has heretofore been proposed.

Those particularly skilled in the art will further appreciate that the problem of geometric steering is made even more complex where the steering units are individually powered traction and steering units which must be rotated effectively at extremely sharp angles.

Through the extremely novel concept of my invention, I contribute a steering apparatus that utilizes very little space on the truck, while being fully effective for geometric steering. More particularly, my apparatus has differential steering control means that need not be positioned near or at the truck wheels, and that may be utilized as part of the manual steering wheel assembly. Even more particularly, my invention can utilize extremely small differential control means because of a relationship which will be described more particularly hereinafter.

In my invention, I utilize preferably a relatively small steering control housing in which I mount miniaturized differential steering control means. Two steering shafts extend from the small control housing, the control means acting to rotate those shafts in differential relation to each other depending upon the direction of rotation of the manual steering wheel or handle. The steering shafts in turn operate through connecting means to rotate the support wheels of the truck on their steering axes. Those connecting means are rather simple and require very little room on the truck, but are so constructed as to steer the wheels at a decreased speed as compared to the rotation of the shaft. The miniaturized steering control means then will be fully effective to cause geometric steering of the wheels and will do that with relatively little effort, yet the steering handle will operate with the mechanical advantage that is required.

I may construct the miniaturized differential control mechanism of my apparatus in various forms. In one form, I utilize a novel arrangement having two rotating control members connected by a link that is so pivoted as to cause differential rotation of the members. One control member is so geared to each steering shaft that the member will rotate a very slight degree while the corresponding shaft rotates at an effective speed through an effective distance. Obviously, the link need move only a short distance, but will effect faster rotation of one steering shaft or the other steering shaft, depending upon the direction of steering rotation. Another form of my miniaturized mechanism has a control gear that rotates in an eccentric axis. That control gear is so arranged as to rotate only a small amount as compared to the rotation of each steering shaft, while causing the shafts to rotate in differentiating relation to each other.

Those skilled in the art will appreciate that whether using one or the other form of mechanism I have set forth, my invention eliminates full-size geometric control means of the type used today and which are now positioned generally at or near the wheels that are to be steered. Thus, it may be stated that I make possible the geometric control of steered wheels through means that are remote from the wheels, and that actually require little room at any point on the truck.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention in order to prevent the appropriation of my invention by those skilled in the art.

In the drawings:
FIG. 1 shows a perspective view of my novel steering apparatus;
FIG. 2 shows one form of differential control mechanism that is a part of my steering apparatus;
FIG. 3 is an exploded view showing parts of the mechanism in perspective;
FIG. 4 shows a further form of differential control mechanism;
FIG. 5 is a section on the line 5—5 of FIG. 4; and
FIG. 6 shows an industrial truck utilizing my invention.

Referring now more particularly to FIG. 1 of the drawings, I show as a part of my novel steering apparatus a relatively small control housing 10 from which a pair of steering shafts 11, 12 extend in a downward direction. Those shafts 11, 12 are arranged close to each other, and will be actuated through miniaturized differential control means contained in the housing 10, as I shall described. In my preferred construction, the control housing 10 will form a part of a steering wheel assembly including manual steering wheel or handle 13. Thus, it will be appreciated that housing 10 is adapted to be mounted on an industrial truck, as I indicate in FIG. 6, with the manual steering wheel 13 in a position convenient to the driver of the truck.

Referring again to FIG. 1, each steering shaft 11, 12 is connected to one of a pair of support wheels 14, 15 that are individually mounted for steering rotation on the truck. The support wheels 14, 15 may be comprised in a pair of steering and traction units such as those described in my earlier application Serial No. 829,111, now Patent No. 3,031,024, but in the construction that I have chosen to illustrate, merely the wheel 14 is part of a steering and traction unit indicated at 16. Wheel 15 simply rotates on a mounting 17, both the mounting 17 and unit 16 being equipped with individual steering sprockets 18 and bearing assemblies 19 on which they are steered. Chains 20, 21 engage the sprockets 18, and also engage relatively small sprockets 22, 23 on the steering shafts 11, 12. Thereby the chains enable each shaft 11, 12 to steer a corresponding wheel 14 or 15 at a speed that is decreased relatively to the shaft speed, as will be understood.

To proceed with the description of my invention, I shall now refer to FIG. 2 of the drawings. In the steering control housing 10, there is a gear 24 that is secured to the steering shaft 11, and a gear 25 secured to steering shaft 12, each gear rotating integrally with its shaft. Each of the gears 24, 25 forms a part of a separate gear reduction series. In detail, gear 24 meshes with a relatively large gear 26 having integral therewith a small gear 27, that gear 27 meshing with another large gear 28 that I shall call a control gear. Similarly, gear 25 meshes with a large gear 29 that is integral with a small gear 30 meshing in turn with large control gear 31. All of those gears will rotate on suitable bearings, as for example on upper bearings 32 mounted in openings 33 in the housing cover 10a, FIG. 3, and lower bearings, not shown, on the bottom of housing 10.

Therefore, it will be understood that this form of my differential steering control mechanism utilizes a pair of control gears 28, 31, each rotating incidental to rotation of a corresponding steering shaft 11 or 12, but rotating merely a slight degree as compared to the effective rotation of that shaft.

I now call attention to the fact that I interconnect the two control gears 28, 31 through a link 34, as shown in FIGS. 2 and 3. I particularly connect opposed ends of the link 34 to the corresponding control gears 28, 31 through pivots 35, 36 that are so offset relatively to the axes of the gears 28, 31, that those gears will rotate in differential angular relation to each other. That will be understood when considering that the individual pivots 35, 36 are shown somewhat offset toward the left and the right, as viewed in FIG. 2. When the control gear 28 rotates counterclockwise, for example, the link 34 may move to the position that is shown at 34a, causing control gear 31 to rotate in the same direction as gear 28 but through a greater angle. While I have described the link 34 used with control gears 28, 31, it is conceivable that the link may be utilized with control members that are not gears, it merely being necessary that link 34 be particularly pivoted to members that are connected through suitable speed reduction means to the steering shafts 11, 12. Therefore, I do not actually wish to be limited to control gears.

By effecting differential rotation between the control gears or members 28, 31, the link 34 will cause the steering shafts 11, 12 to rotate in differential angular relation to each other. Thus, when steering in one direction, shaft 11 will rotate somewhat faster than does shaft 12, while the reverse is true when steering in the opposed direction. The particular rotation of shafts 11, 12 then will act through the speed decreasing chains 20, 21, to effect geometric steering of the two support wheels 14, 15 on the truck.

In the construction I have described, each control gear 28 or 31 naturally will rotate through a smaller angle than does its corresponding steering shaft 11, 12. Therefore, the link 34 need move only a very short distance as the wheels are steered. That distance will be short even though the truck wheels 14, 15 are steered through a very wide angle. Also, the link 34 may itself be quite short. These things enable the control housing 10, which contains the link 34 together with the several gears, to be small in size, the dimensions of housing 10 being considerably less than the distance between the steering axes of support wheels 14, 15. Thus, it will be realized that my novel steering apparatus has a miniaturized differential control means that will require but little room on the truck.

I believe it will be rather obvious that my control means will operate without regard to the particular point at which an operating force is applied for steering the truck wheels. However, as I have already indicated, I do prefer to arrange the steering wheel 13 on the control housing 10, and I then apply the operating force from wheel 13 rather directly to one of the steering shafts 11, 12. For the particular purpose, I show the shaft 11 equipped with a gear 37, FIGS. 2 and 3, that meshes with a gear 38 in control housing 10. The gear 38 is fixed on a shaft 39 to which the steering wheel 13 is secured.

In that arrangement, the steering wheel 13 will act directly through gears 37, 38 to rotate the shaft 11, while acting through appropriate gears and the link 34 to rotate the steering shaft 12. It will be appreciated that the truck wheels 14, 15 then will be steered in a direction that is opposed to the rotation of steering wheel 13, that being a type of steering that generally is desired when the steered wheels are mounted on the rear end of an industrial truck. In some cases, the operators of industrial trucks do wish to have an "automotive" type of steering, that is, with the steering wheel and the truck wheels rotating in the same direction. In those cases, I may equip the steering wheel shaft 39 with a gear, not shown, that actually meshes with the gear 26, the gears 37 and 38 then being omitted. Regardless of the parts through which the steering force is applied, it will be understood from the description I have already made that my mechanism will cause steering shaft 12 to rotate in its proper geometric relation to steering shaft 11.

It will be understood also that my miniaturized control mechanism will operate with relatively little effort through the steering shafts 11, 12, since those shafts steer through the speed reducing chains 20, 21. Thus, the mechanism will operate without strain yet the steering handle 13 will operate with a considerable mechanical advantage.

In FIG. 2, I show in phantom a pair of wheel position indicators 40, 41 that may be utilized with my novel steering control mechanism. Each indicator 40, 41 will be secured to the upper end of one control gear 28, 31, as by screws 42, those indicators being arranged above the top of housing 10 in position to be seen by the truck driver. The operation of the indicators 40, 41 will be understood when it is realized that the sizes of the chain sprockets 22, 23 and 18, 18, FIG. 1, may be so chosen as to contribute a speed ratio that is opposed to the ratio of the several gears in the control housing 10.

I shall now describe the particular form of differential control mechanism that I show in FIGS. 4 and 5. In that form, I utilize a small control housing 110 adapted to be mounted in a position remote from the steered support wheels of the truck, as is the housing 10 in FIGS. 1 and 6. A pair of steering shafts 111, 112 extend from housing 110 in a downward direction toward the steered wheels. Each steering shaft 111, 112 will steer a truck wheel at a decreased speed, in the manner that I have already described in connection with the first form of my invention, and I believe it will be sufficient in FIG. 5 to show each shaft 111, 112 merely equipped with a sprocket 122 or 123 for actuating a speed decreasing chain.

The upper end of each steering shaft 111, 112 extends into the housing 110, as shown in FIG. 5, and is equipped with a small gear 124 or 125 rotating integrally with the shaft. The steering shaft 111 further extends beyond the housing 110 and is equipped with a steering wheel or handle 113. Between and meshing with both gears 124, 125, I arrange a gear 45 that is considerably larger than those gears 124 and 125.

The large gear 45 has a pair of upper and lower stub shafts 46, 47, FIGS. 4 and 5, that are arranged in an eccentric axis on the gear. The stub shafts 46, 47 rotate on slide blocks 48, 49 that move in a transverse direction in upper and lower guideways 50, 51 formed on inner surfaces of the housing 110. That construction will cause the large gear 45 to have an eccentric movement while rotating in mesh with the small gears 124, 125. If we assume for example that large gear 45 rotates 90° clockwise as viewed in FIG. 4 that gear will move eccentrically in a downward direction to the dotted line position 45', while the slide blocks 48, 49 move toward the left to the position 48', 49'. Because of the eccentric movements of gear 45, the steering shafts 111, 112 will rotate in differentiating relation to each other. Thus, while the manual steering wheel 113 acts directly to rotate shaft 111, shaft 112 will rotate at a faster or slower rate, depending upon the direction in which the driver rotates the steering wheel 113. Naturally, it will be appreciated that the large gear 45 will move through a relatively small angle while both of the small gears 124, 125 rotate a much greater amount. Thus, it may be said that this form of my invention utilizes a control member that will rotate a very slight degree while the steering shafts 111, 112 rotate at an effective speed through an effective distance.

As I have already described, the steering shafts 111, 112 will act through speed decreasing means to rotate the truck support wheels. Thereby, the miniaturized differential control mechanism that I show in FIGS. 4 and 5 will effect geometric steering of the wheels, and moreover, will do that with relatively little effort through the steering shafts 111, 112.

I believe that those persons skilled in the art will now understand the construction and operation of my novel steering control for an industrial truck, and will appreciate the very considerable advantages of my control over those of the prior art. Through the novel concept of my invention, I am able to construct a steering control that will contribute very effective geometric steering, while utilizing very little space on the truck. Actually, my control mechanism will require no room near the truck wheels or their mountings. These things I accomplish while enabling my mechanism to steer the wheels through a wide angle, meeting very well the steering requirements of an industrial truck. Therefore, it will be understood that I have made a contribution of considerable value to the industrial truck art, and I believe that the merits of my invention will be fully appreciated.

I now claim:

1. In a truck of the class described having a pair of support wheels mounted for steering rotation,
   a pair of steering shafts connected one to each support wheel,
   steering control mechanism including a pair of rotatably mounted control members,
   a link pivoted at one end to one of said control members and at its other end to the other control member for interconnecting said control members, said link being pivoted to said control members at points that are so offset relatively to the axes of the control members as to effect differential angular rotation between said members,
   and gear means connecting one of said control members to each steering shaft and having a gear ratio whereby each control member rotates a relatively slight degree while the corresponding shaft rotates an effective distance to steer its wheel, enabling the control mechanism to be relatively small while adapted to effect geometric steering of the support wheels through rotation of one or the other support wheel at a slightly higher speed when the wheels are steered in one or the reverse direction.

2. In a truck of the class described having a pair of support wheels mounted for steering rotation,
   a steering control housing,
   a pair of steering shafts extending from the steering control housing and connected one to each support wheel,
   mechanism including a pair of control gears,
   a link pivoted at one end to one of said control gears and at its other end to the other control gear for interconnecting said control gears, said link being pivoted to said control gears at points that are so offset relatively to the axes of the control gears as to effect differential angular rotation between said gears,
   and further gears connecting one of said control gears to each steering shaft and having a gear ratio whereby each control gear rotates a slight degree while the corresponding shaft rotates an effective distance to steer its wheel, enabling said mechanism and therefore the control housing to be relatively small while said mechanism is adapted to effect geometric steering of the support wheels through rotation of one or the other support steering shafts at a slightly higher speed when steered in one or the reverse direction.

3. In a truck of the class described having a pair of support wheels mounted for steering rotation,
   steering control mechanism for said wheels including a pair of rotatably mounted control members,
   means acting between said control members as they rotate to effect differential angular rotation of said members relatively to each other,
   a pair of steering shafts,
   gear means connecting one of said control members to each steering shaft and having a speed ratio whereby each control member rotates a slight degree while the corresponding shaft rotates through a relatively large angle,
   means through which one steering shaft rotates each support wheel with a speed ratio opposed to that of the gear means,
   and the control members by their differential rotation effecting geometric steering of the support wheels through rotation of one or the other support wheel at a slightly higher speed when steered in one or the reverse direction.

4. In a truck of the class described having a pair of support wheels mounted for steering rotation,
   a steering control housing,
   a pair of steering shafts extending from the steering control housing and connected one to each support wheel,
   two series of gears mounted in the steering control housing and connected one series to each steering shaft, each series of gears including a control gear rotating a relatively slight degree as the corresponding shaft rotates an effective distance to steer its wheel,
   a link pivoted at one end to one of said control gears and at its other end to the other control gear in said housing for interconnecting said control gears and therefore said steering shafts,
   and said link being pivoted to said control gears at point that are so offset relatively to one another on the control gears as to effect differential angular rotation between said gears, whereby to effect geometric steering of the support wheels through rotation of one or the other steering shaft at a higher speed in one or the reverse direction.

5. In a truck of the class described having a pair of support wheels mounted for steering rotation,
   a steering control housing adapted to be mounted in position remote from said support wheels on the truck,
   a pair of steering shafts extend from the steering control housing and connected one to each support wheel,
   two series of gears mounted in the steering control housing and connected one series to each steering shaft, each series of gears including a control gear rotating a relatively slight degree while the corresponding shaft rotates an effective distance to steer its wheel,
   a link pivoted at one end to one of said control gears and at its other end to the other control gear in said housing for interconnecting said control gears and therefore said steering shafts, said links being pivoted to said control gears at points that are so offset relatively to one another on the control gears as to effect differential angular rotation between said gears, and a steering wheel supported on said control housing and connected to the gears in said housing for actuating said gears, whereby to effect geometric steering of the support wheels through rotation of one or the other steering shaft at a higher speed in one or the reverse direction.

6. In a truck of the class described having a pair of support wheels mounted for steering rotation, a pair of rotatable steering shafts connected one to each wheel, a pair of control gears, a reducing gear between each steering shaft and a corresponding control gear whereby each control gear rotates at a highly reduced speed relatively to one steering shaft, a link between said control gears for imparting movement from one control gear to the other, and said link acting through the control gears and reducing gears to control the steering relation between the truck wheels as the wheels rotate to different steering positions.

7. In a truck of the class described having a pair of support wheels mounted for steering rotation, a pair of rotatable steering shafts connected one to each wheel, a pair of control gears, a reducing gear between each steering shaft and a corresponding control gear whereby each control gear rotates at a highly reduced speed relatively to one steering shaft, a link pivoted at one end to one control gear and at its other end to the other control gear, said link being pivoted at points so offset relatively to one another on the control gears as to effect differential angular rotation between said control gears, and said control gears by their reduced speed enabling the link to effect geometric steering of the truck wheels while the link has relatively small size and degree of movement.

8. In a truck of the class described having a pair of support wheels mounted for steering rotation, a pair of rotatable steering shafts connected one to each wheel, a pair of control gears, a series of reducing gears between each steering shaft and a corresponding control gear whereby each control gear rotates at a highly reduced speed relatively to one steering shaft, a link pivoted at one end to one control gear and at its other end to the other control gear, said link being pivoted to the control gears at points that are offset in opposed directions relatively to the bearing axes of said control gears so as to effect differential angular rotation between said control gears, and said series of reducing gears enabling the differential rotation of the control gears to effect geometric steering of the truck while the link has relatively small size and degree of movement.

9. In a truck of the class described having a pair of support wheels mounted for steering rotation, a pair of rotatable steering shafts connected one to each wheel, a steering wheel connected to one steering shaft for rotating that shaft and its corresponding truck wheel, a link pivoted between a pair of control gears for imparting rotation from one control gear to the other, said link being pivoted to the control gears at points that are so offset relatively to the bearing axes of said control gears as to effect differential angular rotation between said control gears, a series of speed reducing gears between said one steering shaft and one control gear whereby both control gears rotate at a highly reduced speed relatively to the rotation of said one steering shaft by the steering wheel, a series of speed increasing gears between the other of said control gears and the other steering shaft for rotating that shaft and its corresponding truck wheel, and said link moving a relatively small degree to hold the truck wheels in geometric steering relation to each other while the truck wheels are steered through a wide angle by said steering wheel.

10. In a truck of the class described having a pair of support wheels mounted for steering rotation, a steering handle mounted in a remote position above said support wheels on the truck, a small steering control housing arranged at the steering handle on the truck, a pair of rotatable steering shafts extending from said small control housing toward the wheels, said shafts being juxtaposed to each other whereby to lie in a narrow space on the truck, a pair of small circular gears mounted in said housing and arranged to rotate each incidental to rotation of one steering shaft, a rotatable further gear having opposed parts meshing one with each gear of the pair of gears in the housing, said further gear being relatively large whereby to rotate a slight degree while each small gear and its shaft rotate through a relatively large angle, means mounting said further gear for eccentric movement incidental to rotation of the further gear, means through which said steering handle acts to rotate said further gear so that said gear by its eccentric movement will effect rotation of the steering shafts at differentiating speeds, speed decreasing means connecting one steering shaft to each support wheel for rotating the wheel on its steering mounting, and said speed decreasing means enabling the eccentrically moving gear in the remote small control housing to act with mechanical advantage and with relatively little effort through the steering shafts to effect geometric steering of the wheels.

11. In a truck of the class described having a pair of support wheels mounted for rotation in steering axes at opposed sides of the truck, a steering handle mounted in a remote position above said support wheels on the truck, a steering control housing arranged at said steering handle and having relatively small dimensions as compared to the distance between the steering axes, a pair of steering shafts extending from said steering control housing toward the support wheels, said shafts being juxtaposed to each other whereby to lie in a narrow space on the truck, upper ends of the shafts extending into said small steering control housing, a pair of small circular gears mounted one to rotate integrally with the upper end of each shaft, a rotatable further gear having opposed parts meshing one with each gear of the pair of gears in the housing, said further gear being relatively large whereby to rotate a slight degree while each small gear and its shaft rotate through a relatively large angle, means mounting said further gear for eccentric movement incidental to rotation of said gear, means through which the steering handle rotates the gears whereby to rotate the steering shafts at differentiating speeds due to the eccentric movements of the further gear, and means connecting a lower portion of each steering shaft to a corresponding support wheel so that the differentiating rotation of said shafts will effect geometric steering of the wheels.

12. In a truck of the class described, a pair of spaced supporting wheels, means mounting each wheel for steering rotation, a steering handle rotatably mounted a substantial distance above said supporting wheels for easy accessibility and manipulation by the operator of the truck, a relatively small steering control mechanism having overall dimensions substantially less than the spacing of the supporting wheels and mounted closely adjacent said steering handle, said control mechanism having a short input shaft connected to said steering handle, two outputs shafts coextending from said control mechanism in a direction toward the support wheels, said shafts being juxtaposed to each other whereby to lie in a narrow space on the truck, an eccentrically rotating control gear operated by said input shaft on the control mechanism and meshing with a pair of gears connected one to each output shaft so as to rotate the output shafts in differentiating relation to each other, said control gear and pair of gears having a speed ratio whereby the control gear rotates a slight degree while each output shaft rotates through a relatively large angle, and speed reducing means operatively connecting one of said output shafts with one of said support wheels and the other output shaft with said other support wheel for rotating said wheels, enabling the steering handle to operate with a mechanical advantage while the eccentric control gear acts with little effort to control geometric steering of the support wheels.

13. In a truck of the class described having a pair of support wheels mounted for steering rotation, a rotatable steering shaft for each support wheel, said shafts extending from the vicinity of said wheels to an upper portion of the truck and being juxtaposed to each other whereby to lie in a narrow space on the truck, miniaturized steering control mechanism on said upper portion of the truck and including a relatively small circular gear on each steering shaft, rotating differential control means having opposed parts meshing one with each of said small gears whereby to effect differential angular rotation of the steering shafts relatively to each other, each of said gears and the part of the control means that meshes with it having a speed ratio whereby the differential control means rotate a slight degree while each steering shaft rotates through a relatively large angle, and means connecting one steering shaft to each support wheel so that said miniaturized mechanism will control steering of said support wheels in geometric relation to each other.

14. In a truck of the class described having a pair of support wheels mounted for steering rotation, a rotatable steering shaft for each support wheel, said shafts extending from the vicinity of said wheels to an upper portion of the truck and being juxtaposed to each other whereby to lie in a narrow space on the truck, miniaturized steering control mechanism on said upper portion of the truck and including a relatively small circular gear on each steering shaft, rotating differential control means having opposed parts meshing one with each of said small gears whereby to effect differential angular rotation of the steering shafts relatively to each other, each of said gears and the part of the control means that meshes with it having a speed ratio whereby the differential control means rotate a slight degree while each steering shaft rotates through a relatively large angle, and means connecting one steering shaft to each support wheel and having a speed ratio opposed to that between its gear and the differential control means, so as to effect geometric steering of said support wheels relatively to each other.

15. In a truck of the class described having a pair of support wheels mounted for steering rotation, a steering wheel mounted in position above and remote from said support wheels, miniaturized steering control mechanism mounted at said steering wheel and actuated by said steering wheel, a rotatable steering shaft for each support wheel, said shafts extending from the vicinity of said wheels upwardly toward said control mechanism and being juxtaposed to each other whereby to lie in a narrow space on the truck, a relatively small circular gear forming a portion of said control mechanism on each steering shaft, rotating differential control means having opposed parts meshing one with each of said small gears whereby to effect differential angular rotation of the steering shafts relatively to each other when the steering wheel actuates the control mechanism, each of said gears and the part of the control means that meshes with it having a speed ratio whereby the differential control means rotate a slight degree while each steering shaft rotates through a relatively large angle, and means connecting one steering shaft to each support wheel so that the miniaturized steering control when actuated by the steering wheel will steer said support wheels in geometric relation to each other.

16. In a truck of the class described having a pair of support wheels mounted for steering rotation, a steering wheel mounted in a position above and remote from said support wheels, miniaturized steering control mechanism mounted at said steering wheel, a pair of rotatable steering shafts extending from the vicinity of said support wheels toward said mechanism and being juxtaposed to each other whereby to lie in a narrow space on the truck, a relatively small circular gear forming a portion of the miniaturized steering control mechanism on each steering shaft, differential control means actuated by the steering wheel and having opposed parts meshing one with each of said gears so that the steering wheel effects differential angular rotation of said gears relatively to each other, each of said small gears and the part of the control means that meshes with it having a speed increasing ratio whereby the differential control means rotate a slight degree while each steering shaft rotates through a relatively large angle, and chain and sprocket means through which one steering shaft rotates each support wheel whereby to steer said support wheels in geometric relation to each other.

17. In a truck of the class described having a pair of support wheels mounted for steering rotation, a steering wheel mounted in a position above and remote from said support wheels, miniaturized steering control mechanism mounted at said steering wheel, a pair of rotatable steering shafts extending from the vicinity of said support wheels toward said mechanism and being juxtaposed to each other whereby to lie in a narrow space on the truck, a relatively small circular gear forming a portion of the miniaturized steering control mechanism on each steering shaft, differential control means actuated by the steering wheel and having opposed parts meshing one with each of said small gears so that the steering wheel effects differential angular rotation of the steering shafts relatively to each other, each of said gears and the part of the control means that meshes with it having a speed increasing ratio whereby the differential control means rotate a slight degree while each steering shaft rotates through a relatively large angle, chain and sprocket means having a speed decreasing ratio connecting one steering shaft to each support wheel, and said steering wheel acting through the miniaturized steering control to steer said support wheels in geometric relation to each other.

18. In a truck of the class described having a pair of support wheels mounted for steering rotation, a rotatable steering shaft for each support wheel, said shafts extending from the vicinity of said wheels to an upper portion of the truck and being juxtaposed to each other whereby to lie in a narrow space on the truck, miniaturized geometric steering control mechanism on said upper portion of the truck and including speed differentiating rotatable control means, means having a particular speed increasing ratio connecting said control means to an upper end of each steering shaft to effect differential angular rotation between said shafts while both shafts rotate through a relatively large angle as compared to rotation of the control means, means having a speed decreasing ratio connecting a lower end of one steering shaft to each support wheel to effect rotation of both wheels a relatively large amount as compared to the rotation of the steering shafts, and said miniaturized steering control acting through the speed increasing and decreasing ratios to steer said support wheels in geometric relation to each other.

19. In a truck of the class described having a pair of support wheels and means mounting each wheel for steering rotation, a steering control housing arranged at a distance above the steering mountings of said truck wheels, a steering wheel mounted to rotate on the steering control housing, a pair of steering shafts extending from the vicinity of the wheel mountings upwardly in parallel directions to the control housing, said shafts being juxtaposed to each other whereby to lie in a narrow space on the truck, speed decreasing means through which the lower end of a steering shaft when rotated a certain amount rotates each wheel mounting a relatively small amount, geometric steering control mechanism mounted in said housing and including speed differentiating means rotated by the steering wheel for rotating one steering shaft faster or slower than the other steering shaft, depending on the direction of steering rotation, and speed increasing means through which the speed differentiating means act when rotating the shafts whereby to cause both shafts to rotate a large amount as compared to the rotation of said differentiating means, said shafts when so rotated steering the truck wheels in geometric relation to each other.

References Cited by the Examiner

UNITED STATES PATENTS

| | | | |
|---|---|---|---|
| 2,399,493 | 4/46 | Luehrs et al. | 74—394 |
| 2,731,277 | 1/56 | Pearne | 280—96 X |
| 2,756,066 | 7/56 | Ludowici | 280—93 X |
| 2,814,499 | 11/57 | Schlecter | 280—293 |
| 2,834,605 | 5/58 | McCollough | 280—91 |
| 2,848,247 | 8/58 | Shreck | 280—96 |
| 2,913,063 | 11/59 | Brown | 280—93 X |
| 2,915,319 | 12/59 | Kumbler et al. | 280—91 |
| 2,945,545 | 7/60 | Ulinski | 280—92 X |

FOREIGN PATENTS

| | | |
|---|---|---|
| 827,227 | 2/60 | Great Britain. |
| 1,197,816 | 12/59 | France. |

MILTON BUCHLER, *Primary Examiner.*

A. HARRY LEVY, KENNETH H. BETTS, *Examiners.*